United States Patent [19]

Tanner et al.

[11] Patent Number: 5,476,114
[45] Date of Patent: Dec. 19, 1995

[54] METHOD OF AND APPARATUS FOR MANUFACTURING OF SHAPED WORKPIECES FORMED FROM A PLASTIC MATERIAL, AND A WORKPIECE MANUFACTURED BY THE METHOD

[75] Inventors: Ernst Tanner, Neuhausen a. Rhf.; Jörg Wermelinger, Schaffhausen, both of Switzerland

[73] Assignee: Georg Fischer Rohrleitungssysteme AG, Schaffhausen, Switzerland

[21] Appl. No.: 186,087

[22] Filed: Mar. 3, 1994

[30] Foreign Application Priority Data

Mar. 4, 1993 [CH] Switzerland .................... 644/93

[51] Int. Cl.⁶ .................................. F16L 55/18
[52] U.S. Cl. ................. 137/15; 251/367; 137/561 A
[58] Field of Search .................. 251/366, 367, 251/61.1; 137/15, 561 A

[56] References Cited

U.S. PATENT DOCUMENTS

| | | | |
|---|---|---|---|
| 4,210,308 | 7/1980 | Sims | 251/367 |
| 4,353,243 | 10/1982 | Martin | 251/61.1 |
| 5,082,237 | 1/1992 | Ayvaz | 251/61.1 |
| 5,125,431 | 6/1992 | Vogel et al. | 137/561 A |
| 5,273,066 | 12/1993 | Graham et al. | 251/61.1 |

*Primary Examiner*—A. Michael Chambers
*Attorney, Agent, or Firm*—Bachman & LaPointe

[57] ABSTRACT

A method of manufacturing by welding a shaped workpiece, which is formed of a plastic material and which consists of a tubular part having a radial bore and a union weldable to the tubular part in a region of the radial bore, includes bringing an end face surface of the union into abutting engagement with an outer circumference of the tubular part in the region of the radial bore, and heating a circular region around the radial bore of the tubular part and the end face surface of the union by heat radiation, with subsequent pressing of the two parts against each other. The apparatus for implementing the method includes first and second clamping devices for supporting the union and the tubular part, respectively, with the second clamping device having a support member having a shape corresponding to an inner profile of the tubular part, and a pin supported in the support member for displacement in a direction transverse to a longitudinal axis of the support member, and a heating device for heating the two parts.

3 Claims, 2 Drawing Sheets

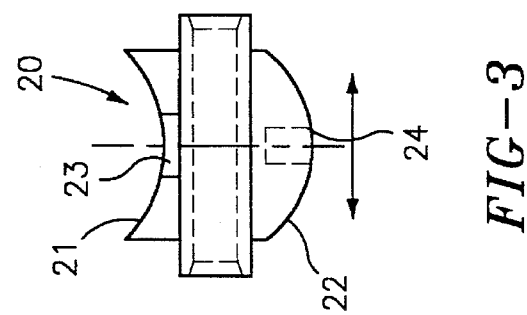
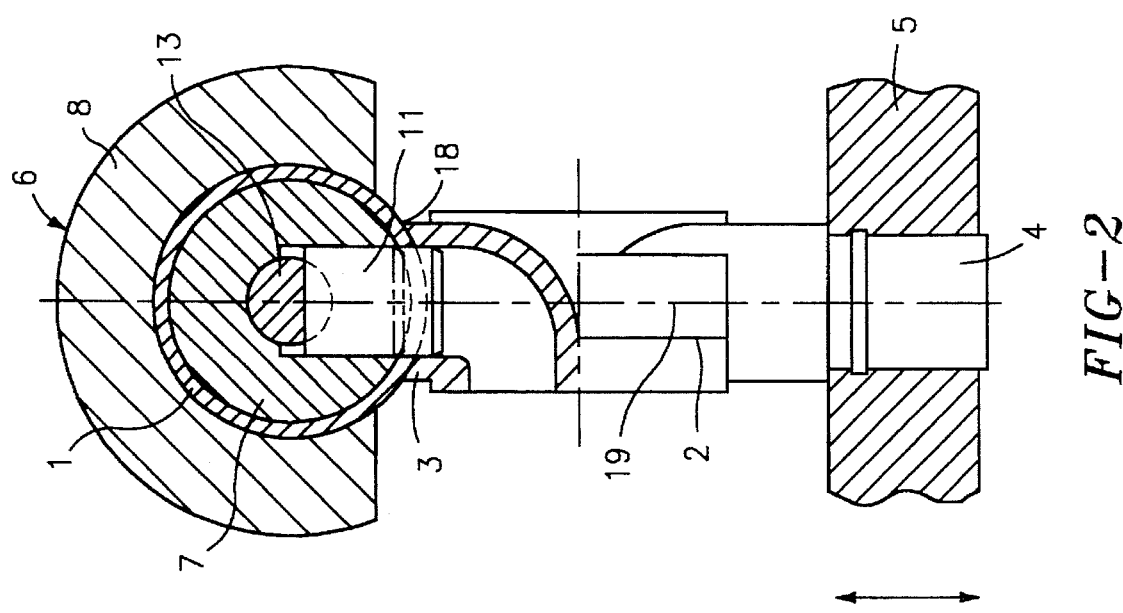

METHOD OF AND APPARATUS FOR MANUFACTURING OF SHAPED WORKPIECES FORMED FROM A PLASTIC MATERIAL, AND A WORKPIECE MANUFACTURED BY THE METHOD

BACKGROUND OF THE INVENTION present invention relates to a method of manufacturing a shaped workpiece formed from a plastic material by welding a union, e.g., of a valve body, with a tubular part, wherein the end face surface of the union is welded to the circumference of the tubular part. The present invention also relates to an apparatus for effecting the inventive method.

A method of welding a union to an outer circumference of a tubular part is disclosed, e.g., in Swiss patent CH-PS 570-577. The Swiss patent discloses a method of welding a union for a branch conduit to an outer circumference of a pipe, according to which method a welding mat formed of a resistance wire is placed between the pipe and a union saddle to provide welding temperatures. However, this method of manufacturing of a shaped workpiece formed of a plastic material is very expensive.

Accordingly, an object of the invention is an improved method of welding of a union to a pipe, which would insure a strong welding connection, without using additional auxiliary means which, at that, forms part of the welding connection.

Another object of the invention is an apparatus for effecting the improved method.

Yet another object of the invention is a shaped workpiece manufactured by the improved method.

SUMMARY OF THE INVENTION

These and other objects of the invention are achieved by providing a method of manufacturing a shaped workpiece formed from a plastic material and consisting of a tubular part having a radial bore and a union weldable to the tubular part in a region of the radial bore, which method comprises bringing an end face surface of the union into abutting engagement with an outer circumference of the tubular part in the region of the radial bore, and heating a circular region around the radial bore of the tubular part and the end face surface of the union by heat radiation. Thereafter, the two parts are pressed against each other to be welded together.

The apparatus for effecting the inventive method comprises first and second clamping devices for supporting the union and the tubular part, respectively, with the second clamping device comprising a support member having a shape corresponding to an inner profile of the tubular part, and a pin supported in the support member for displacement in a direction transverse to a longitudinal axis of the support member. The apparatus further includes a heating device pivotable into a position between the tubular part and the union for heating the two parts. The shaped workpiece, which is manufactured by the improved method, thus, consists of a tubular part having a radial bore and a union, the end face surface of which abuttingly engages the circumference of the tubular part in the region of the radial bore and is fixedly connected to the outer surface by welding.

BRIEF DESCRIPTION OF THE DRAWINGS

The features and objects of the present invention will become more apparent and the invention itself will be best understood from the following detailed description of the preferred embodiment when read with reference to the accompanying drawings, wherein:

FIG. 2 is a cross-sectional view along line II—II in FIG. 1; and

FIG. 3 is a plan view of a heating device used in apparatus according to the present invention.

DETAILED DESCRIPTION OF THE PREFERRED EMBODIMENT

Figure 1:
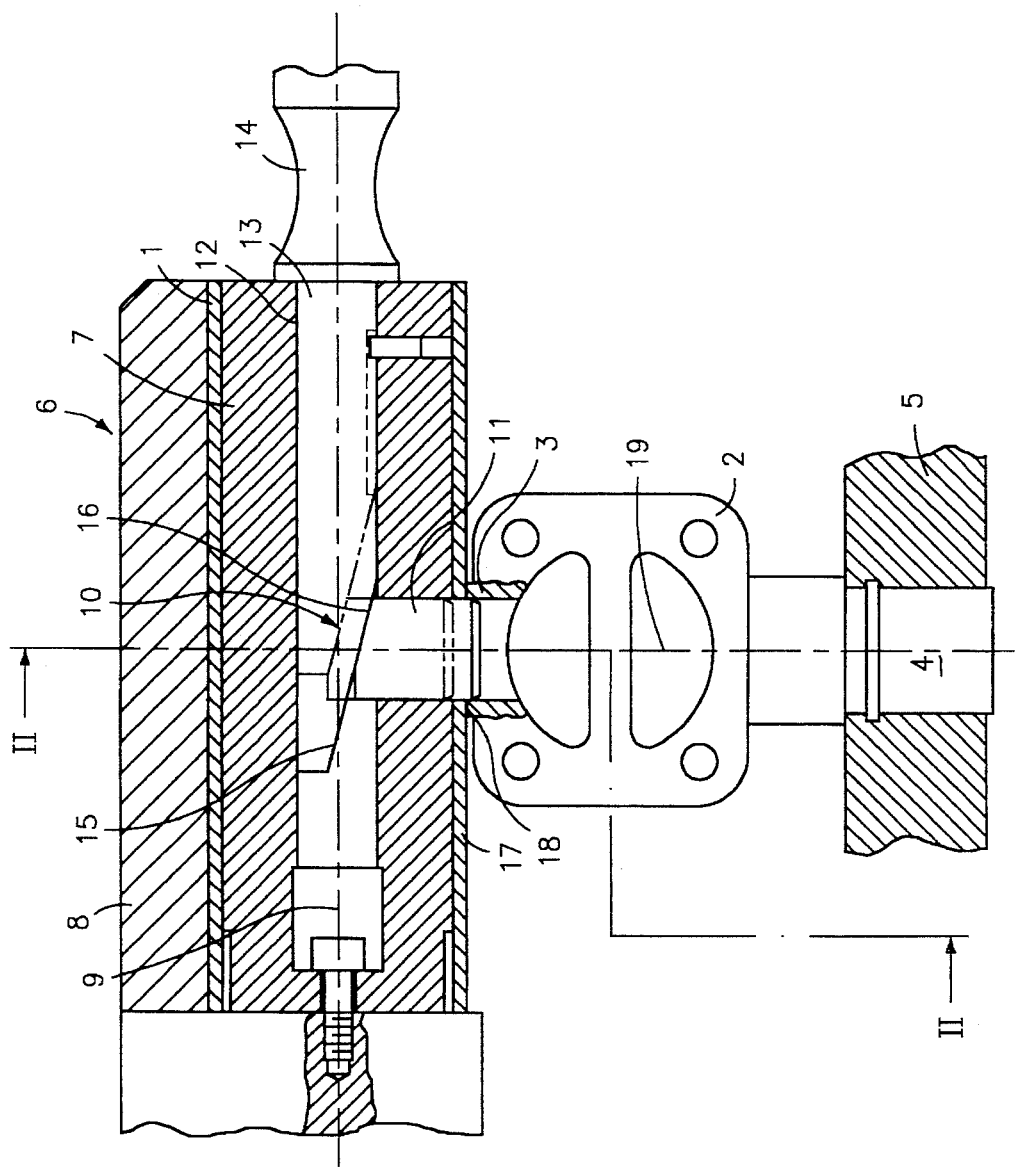
FIG. 1 is a simplified cross-sectional view of a welding apparatus according to the present invention with parts to be welded.

The apparatus according to the present invention and shown in the drawings is used for manufacturing a shaped workpiece made of a plastic material by welding. In particular, the inventive apparatus may be used for welding a tubular part 1, e.g., a connector of a valve body 2 of a diaphragm valve. The connector is provided with two unions 3 and 4 and is made of a plastic material. The valve body 2 is fixedly retained by its union 4 in a clamping device 5, which is mounted on displaceable carriage (not shown). Another part provided with a union 3 can be welded to the part 1. The tubular part 1 is form-lockingly retained in another clamping device 6. The clamping device 6 is provided with an outer support member 8, which partially surrounds the outer circumference of the part 1, and an inner support member 7, which corresponds to the inner profile of the tubular part 1. On the inner support member 7, there is provided transverse to the longitudinal axis 9 thereof, a displaceable pin 11 which is displaced by a wedge 10. The wedge 10 is formed by a bar 13, which is displaceable in a bore 12 of the inner support member 7 by a handle 14. The bar 13 has an inclined surface 15 which is engageable to an inclined surface 16 of the pin 11.

When the bar 13 is pushed in, the pin 11 is displaced through a bore 17 so far that it extends into a union 3 of the valve body 2. The outer diameter of the pin 11 corresponds to the inner diameter of the union 3.

In order to remove the welded part, the pin 11 should be retracted from the union 3. It is possible to move the wedge 10 by means of a corresponding form-locking connection between the bar 13 and the pin 11 in both directions.

Instead of a handle 14, a cylinder-piston drive can be used for displacement of the bar 13.

The apparatus according to the present invention is further equipped with a heating device 20 which provides for contactless heating of the end face surface 18 of the union 3 and a portion of the outer circumference of the part 1 with infra-red rays. The heating device is displaceable or pivotable between the part 1 and the union 3 and is brought, for rapid heating, within about 1–2 mm from the heated surfaces, by being axially displaced by the clamping device 5.

The heating device 20 has a concave radiating surface 21, corresponding to the outer circumference of the part 1, and a convex radiating surface 22 corresponding to the end face surface 18 of the union 3. Both radiating surfaces have centrally arranged recesses 23 and 24, respectively. The heating device 20 is heated e.g., with an electrical heating cartridge and is made, preferably, of copper, with the radiating surfaces 21 and 22 being lined with ceramics. The operational process is effected as it is described below.

The tubular part 1 has, as it has already been mentioned, the bore 17. The tubular part 1 is mountable in the clamping device 6, and the valve body 2 is held with the union 4 in the clamping device 5, so that the end face surface 18 of the union 3 form-lockingly abuts the outer diameter of the part 1.

Upon pivoting the heating device 20, the end face surface 18 of the union 3 and the circumference of bore 1 are heated, in the region of the bore 17, to a melting condition of the plastic material. Upon returning of the heating device 20 to its initial position, the pin 11 is displaced in the direction of its axis 19 by the wedge 10 so that it extends through the bore 17, and the valve body 2 is simultaneously pressed against the outer circumference of the part 1 by displacement of the not-shown carriage.

Because both the part 1 and the union 3 are supported from within, the deformation of these two parts during welding is excluded, and no inner build-up or burry develop, which might have presented an obstacle to free flow of a medium.

While a particular embodiment of the invention has been shown and described, various modification thereof will be apparent to those skilled in the art and, therefore, it is not intended that the invention be limited to the disclosed embodiment or the details thereof, and the departures may be made therefrom within the spirit and scope of the invention as defined in the appended claims.

What is claimed is:

1. A shaped workpiece made of a plastic material, comprising a tubular part having a radial bore and an outer circumference, and a union having an end face surface, which abuttingly engages the circumference of the tubular part in a region of the radial bore and is fixedly connected therewith by welding, wherein the weld is affected by means separate from the end face surface of the union for supporting a portion of the outer circumference of the tubular part at least in the region of the radial bore and heating a circular region around the radial bore of the tubular part and the end face surface of the union by heat radiation after the end face surface of the union was brought into an abutting engagement with the outer circumference of the tubular part and, thereafter, pressing the two parts to each other.

2. A shaped workpiece as set forth in claim 1, wherein the union forms part of a valve body having a longitudinal axis extending transverse to a longitudinal axis of the tubular part.

3. A shaped workpiece as set forth in claim 2, wherein the valve body is formed as a housing of a diaphragm valve.

* * * * *